US006952686B1

(12) United States Patent
Kudo

(10) Patent No.: US 6,952,686 B1
(45) Date of Patent: Oct. 4, 2005

(54) ELECTRONIC CONTRACT SAFEKEEPING METHOD, ELECTRONIC CONTRACT VERIFYING METHOD, CONTRACTOR SERVER, CONTRACT SAFEKEEPING SERVER, ELECTRONIC CONTRACT SAFEKEEPING SYSTEM, AND MEMORY MEDIUM

(75) Inventor: Toshiyuki Kudo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 731 days.

(21) Appl. No.: 09/926,148

(22) PCT Filed: Sep. 25, 2000

(86) PCT No.: PCT/JP00/06557

§ 371 (c)(1), (2), (4) Date: Oct. 10, 2001

(87) PCT Pub. No.: WO02/27573

PCT Pub. Date: Apr. 4, 2002

(51) Int. Cl.[7] .............................................. G21C 17/60
(52) U.S. Cl. .......................................... 705/75; 705/80
(58) Field of Search ............................. 705/75, 44, 80, 705/35; 713/175, 176, 201; 707/204

(56) References Cited

U.S. PATENT DOCUMENTS

| | | | | |
|---|---|---|---|---|
| 4,981,370 A | * | 1/1991 | Dziewit et al. | 713/176 |
| 5,191,613 A | * | 3/1993 | Graziano et al. | 713/176 |
| 6,067,531 A | * | 5/2000 | Hoyt et al. | 705/35 |
| 6,292,897 B1 | * | 9/2001 | Gennaro et al. | 713/175 |
| 6,574,640 B1 | * | 6/2003 | Stahl | 707/204 |

FOREIGN PATENT DOCUMENTS

| | | |
|---|---|---|
| JP | 9-214624 | 8/1997 |
| JP | 10-187836 | 7/1998 |
| JP | 11-316779 | 11/1999 |
| JP | 2000-242721 | 9/2000 |

OTHER PUBLICATIONS

Y. Ito, et al., Fujitsu, vol. 49, No. 4, pp. 271-275, "Development of Electronic Notary Public System", Jul. 10, 1998.

* cited by examiner

Primary Examiner—Salvatore Cangialosi
(74) Attorney, Agent, or Firm—Oblon, Spivak, McClelland, Maier & Neustadt, P.C.

(57) ABSTRACT

An electronic safekeeping method, including displaying a contractual coverage of a contract at a covenantee terminal connected to a contractor server storing information of the contractual coverage; inputting contract agreement information representing whether agreeing to the contractual coverage or not, at the covenantee terminal; inputting safekeeping agreement information representing whether agreeing to a safekeeping of the contractual coverage or not, at the covenantee terminal, when the contract agreement information agreeing to the contractual coverage is inputted; requesting a contract safekeeping server to store the contractual coverage, when the safekeeping agreement information agreeing to the safekeeping is inputted; issuing a contract ID for identifying the contract at the contract safekeeping server in accordance with the request; and transferring the issued contract ID from the contract safekeeping server to the covenantee terminal and the contractor server.

6 Claims, 4 Drawing Sheets

ELECTRONIC CONTRACT SAFEKEEPING METHOD, ELECTRONIC CONTRACT VERIFYING METHOD, CONTRACTOR SERVER, CONTRACT SAFEKEEPING SERVER, ELECTRONIC CONTRACT SAFEKEEPING SYSTEM, AND MEMORY MEDIUM

SUMMARY OF THE INVENTION

1. Technical Field

The present invention relates to an electronic contract safekeeping method, an electronic contract verifying method, a contractor server, a contract safekeeping server, an electronic contract safekeeping system, and a memory medium, all through a network.

2. Background Art

When engaged in business, it is customary to enter into a contract: at the dealings of a commodity, a sales contract is concluded between a distributor of the commodity and a purchaser thereof, for instance.

Recently, there is an increasing tendency in dealing commodities through the internet. In some cases, on a homepage for sales of a distributor of the commodities, a contractual coverage is displayed. Based on this contractual coverage, a contract is concluded.

DISCLOSURE OF THE INVENTION

However, after the sales of the commodities (after conclusion of the contract), the contractual coverage on the homepage for sales may be superseded.

At that time, between the distributor and the purchaser, there may occur a discrepancy in understanding of the contractual coverage at the conclusion of the contract.

At that time, the purchaser is necessitated to verify the contractual coverage at the conclusion of the contract. When the purchaser cannot verify the above, the purchaser may suffer unreasonable losses.

The present invention is to these existing problems. An object of the present invention is to provide a method that, even when the contractual coverage on a home page for sales has been superseded, enables the purchaser (covenantee) to verify the contractual coverage (purport of the contract).

Another object of the present invention is to provide an electronic contract safekeeping method and an electronic contract safekeeping system, in which a third party other than the contractor keeps the contractual coverage, and, as demands arise, may verify the contractual coverage.

(1) In order to achieve the above objects, a contract safekeeping method involving the present invention comprises causing to display the contractual coverage, causing to input safekeeping agreement information to agree, causing to keep the contractual coverage, causing to issue a contract ID, and causing to notify of the ID. In the above, in the causing to display the contractual coverage, the contractual coverage is caused to display at a covenantee terminal connected to a contractor server therein the contractual coverage is kept. In the causing to input the safekeeping agreement information to agree, the safekeeping agreement information agreeing to the safekeeping of the contractual coverage caused to display in the causing to display the contractual coverage is caused to input to agree at the covenantee terminal. In the causing to keep the contractual coverage, the contract safekeeping server is caused to keep the contractual coverage corresponding to the safekeeping agreement information caused to input in the causing to input the contract safekeeping agreement information to agree. In the causing to issue the ID, a contract ID for identifying the contractual coverage kept in the causing to keep the contractual coverage is caused to issue. In the causing to notify of the ID, the contract ID caused to issue in the causing to issue the ID is caused to notify to the contract server and the covenantee terminal.

Being kept in the contract safekeeping server different from both the contractor server and the covenantee terminal, there is no fear of the contractual coverage being altered. By making access to the contract safekeeping server, the contractual coverage may be confirmed and verified.

(2) A method for verifying the electronic contract involving the present invention comprises the covenantee terminal entering into connection with the contract safekeeping server, inputting the contract ID, and exhibiting the contractual coverage. In the above, in the inputting the contract ID, at the covenantee terminal, the contract ID of the contractual coverage kept at the contract safekeeping server is input. In the exhibiting the contractual coverage, to the covenantee terminal, the contractual coverage corresponding to the contract ID that is input at inputting the contract ID is exhibited.

When the covenantee terminal enters into a connection with the contract safekeeping server and shows the contract ID, the contractual coverage is exhibited, thereby the contractual coverage being verified.

(3) The contractor server involving the present invention comprises a contractual coverage notifying portion, a contract safekeeping agreement receiving portion, a contract safekeeping requesting portion, and a contract ID transferring portion. In the above, the contractual coverage notifying portion notifies the covenantee terminal of the contractual coverage. The contract safekeeping agreement receiving portion encourages the covenantee terminal notified of the contractual coverage by the contractual coverage notifying portion to input safekeeping agreement information agreeing to the safekeeping of the contractual coverage, and receives the safekeeping agreement information. The contract safekeeping requesting portion, corresponding to the reception of the safekeeping agreement information by the contract safekeeping agreement receiving portion, requests the contractor server to keep the contractual coverage. The contract ID transferring portion, notified by the contract safekeeping server of the contract ID identifying the contract kept corresponding to the request due to the contract safekeeping requesting portion, to transmit the contract ID to the covenantee terminal.

The contractual coverage notified by the contractor server is kept in the contract safekeeping server. Accordingly, the contract may be concluded between the covenantee terminal and the contractor server without fearing the superceding of the contractual coverage.

(4) The contract safekeeping server involving the present invention comprises a contract safekeeping request receiving portion, a contract safekeeping instructing portion, a contract ID issuing portion, and a contract ID notifying portion. In the above, the contract safekeeping request receiving portion receives a safekeeping request of the contractual coverage. The contract safekeeping instructing portion instructs to keep the contractual coverage of which safekeeping request is received at the contract safekeeping request receiving portion. The contract ID issuing portion issues the contract ID identifying the contract of which safekeeping request is received at the contract safekeeping request receiving portion. The contract ID notifying portion notifies of the contract ID issued at the contract ID issuing portion.

The contract ID is issued and notified for the kept contractual coverage, by making access to the contract safekeeping server with the contract ID, the contractual coverage may be confirmed.

MODES FOR IMPLEMENTING THE INVENTION

In the following, modes for implementing the present invention will be explained in detail with reference to the drawings.

Figure 1:
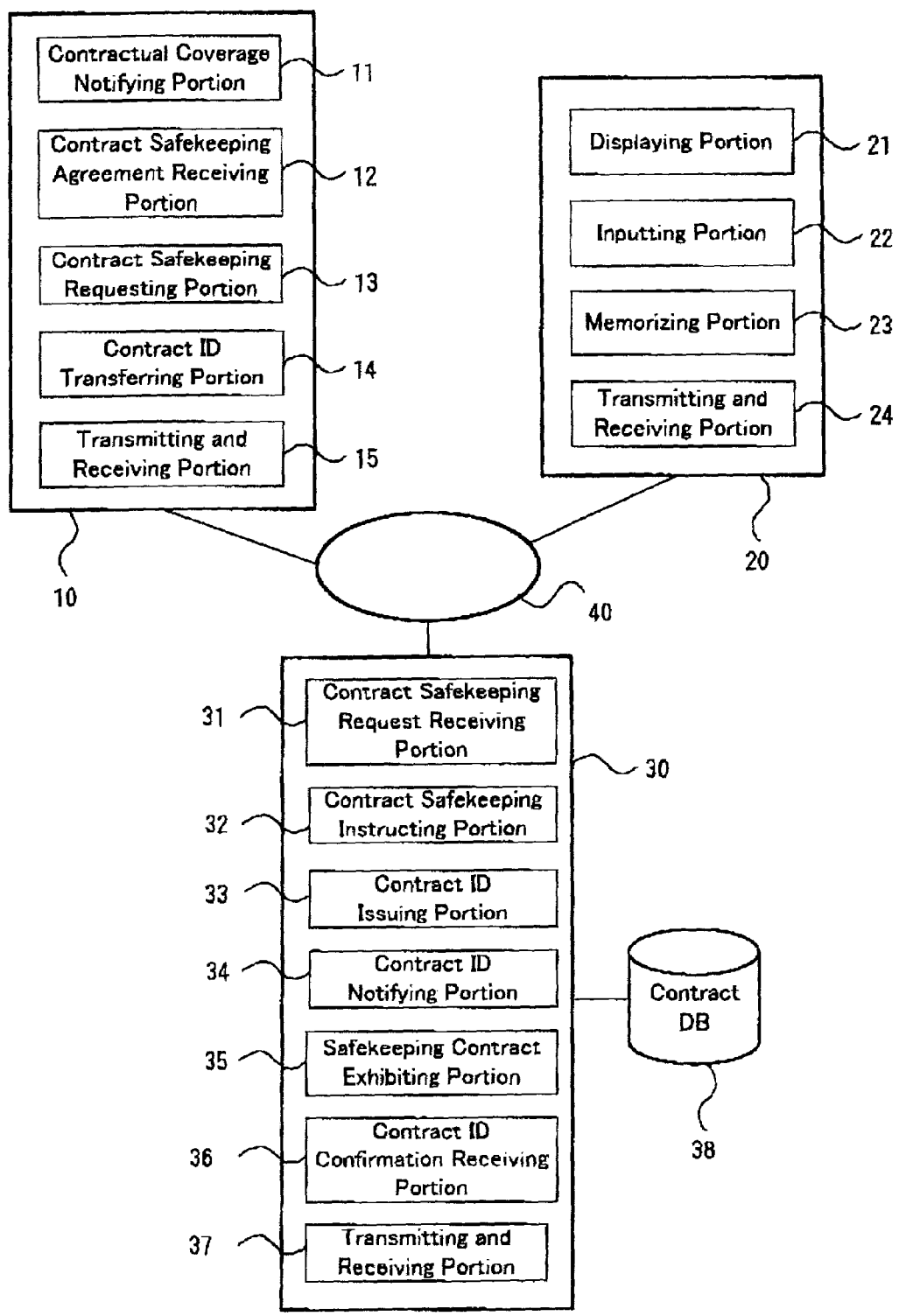
FIG. 1 is a block diagram showing a configuration of a contract safekeeping system involving the present invention.

FIG. 1 is a block diagram showing a configuration of a contract safekeeping system involving the present invention. As shown in FIG. 1, a contractor server 10 and a covenantee terminal 20, and a contract safekeeping server 30 are interconnected to each other through a network 40 such as the Internet.

The contractor server 10, a server computer of the distributor of commodities for instance, opens a home page including a page for contract (a page for dealing commodities, for instance) on the network 40.

The covenantee terminal 20, a computer of the purchaser of the commodities for instance, enters into a connection through the network 40 with the contractor server 10 to browse the content of the home page of the contractor server 10. Thereby, the covenantee terminal may purchase the commodities and conclude the contract at that time through the network 40.

The contract safekeeping server 30 keeps the contractual coverage concluded between the contractor server 10 and the covenantee terminal 20, and verifies the contractual coverage.

Though only one covenantee terminal 20 is shown in FIG. 1, actually it is usual that a lot of covenantee terminals 20 are connected to the network 40. Furthermore, one contract safekeeping server 30 may keep the contractual coverage of a plurality of contractor servers 10.

In addition, there may be a plurality of the contract safekeeping servers 30 for one contractor server 10. As mentioned below, at that time, as needs arise, the contract safekeeping server 30 may be designated to keep the respective contractual coverage.

The contractor server 10 comprises a contractual coverage notifying portion 11, a contract safekeeping agreement receiving portion 12, a contract safekeeping requesting portion 13, a contract ID transferring portion 14, and a transmitting and receiving portion 15.

The contractual coverage notifying portion 11 notifies, through the network 40, the covenantee terminal 20 of the contractual coverage. The contract safekeeping agreement receiving portion 12 encourages the covenantee terminal 20 to input the safekeeping agreement information agreeing to the safekeeping of the contractual coverage, and receives the safekeeping agreement information. The contract safekeeping requesting portion 13, in accordance with the reception of the safekeeping agreement information by the contract safekeeping agreement receiving portion 12, requests the contract safekeeping server 30 to keep the contractual coverage. The contract ID transferring portion 14, notified from the contract safekeeping server 30 of the contract ID (IDentification) for identifying the contract kept according to the request by the contract safekeeping requesting portion 13, transfers the contract ID to the covenantee terminal 20. The transmitting and receiving portion 15 enters into a connection with the network 40 to implement the transmission and reception of the contract ID and so on between both the covenantee terminal 20 and the contract safekeeping server 30.

The covenantee server 20 includes a display portion 21, an input portion 22, a memory portion 23, and a transmission and reception portion 24.

The display portion 21, display means such as CRTs, LCDS and so on for instance, browses on the home page of the contractor server 10 and displays the contractual coverage. The input portion 22, a keyboard, a mouse and so on for instance, inputs the safekeeping agreement information agreeing to the safekeeping of the contractual coverage. The memory portion 23 includes, besides a memory device such as a memory or the like, an auxiliary memory device such as for instance a hard disk or the like, and memorizes the information such as the contract ID or the like. The transmitting and receiving portion 24 enters into a connection with the network 40 to transmit and receive the information between both the contractor server 10 and the contract safekeeping server 30.

The contract safekeeping server 30 comprises a contract safekeeping request receiving portion 31, a contract safekeeping instructing portion 32, a contract ID issuing portion 33, a contract ID notifying portion 34, a kept contract exhibiting portion 35, a contract ID confirmation receiving portion 36, and a transmitting and receiving portion 37. Thereto a contract safekeeping DB (database) 38 constituted of an auxiliary memory device such as a hard disk or the like is connected for safekeeping the contractual coverage.

The contract safekeeping request receiving portion 31 receives a safekeeping request of the contractual coverage from the contract server 10. The contract safekeeping instructing portion 32, in accordance with the reception of the safekeeping request at the contract safekeeping request receiving portion 31, instructs to keep the contractual coverage. Based on the instruction, the contractual coverage is kept in the contract safekeeping DB 38. The contract ID issuing portion 33, in accordance with the reception of the safekeeping request at the contract safekeeping request receiving portion 31, issues the contract ID for identifying the contractual coverage. The contract ID notifying portion 34 notifies the contractor server 10 of the contract ID issued by the contract ID issuing portion 33. The kept contract presenting portion 35, in accordance with the exhibition of the contract ID from the covenantee terminal 20 or the contractor server 10, notifies (exhibit) the contractual coverage corresponding to the contract ID. The contract ID confirmation receiving portion 36 receives the contract ID confirmation information to the effect that the contract ID notified by the contract ID notifying portion 34 is confirmed. The transmitting and receiving portion 37 enters into a connection with the network 40 to transmit and receive the information such as the contract ID or the like between both the contractor server 10 and covenantee terminal 20.)

The above contractor server 10 and the contract safekeeping server 30 are configured by materializing, by means of a contract safekeeping software and a contract safekeeping and verification software held therein respectively, the respective functions on the computer. The contract safekeeping software and the contract safekeeping and verification software, at the safekeeping of the contractual coverage, work with each other through the network 40.

Figure 2:
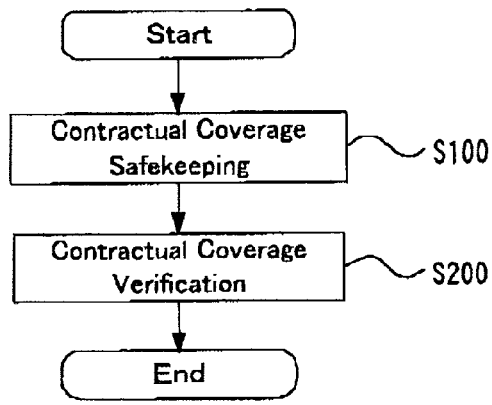
FIG. 2 is a flow chart showing rough procedures in the contract safekeeping system shown in FIG. 1.

FIG. 2 is a flowchart showing rough procedures in the contract safekeeping system shown in FIG. 1. The contractual coverage concluded between the contractor server 10 and the covenantee terminal 20 is kept at the contract safekeeping server 30 (step S 100). Thereafter, the contractual coverage kept at the contract safekeeping server 30, as needs arise, is called up to use for verifying the contractual coverage (step S 200).

Figure 3:
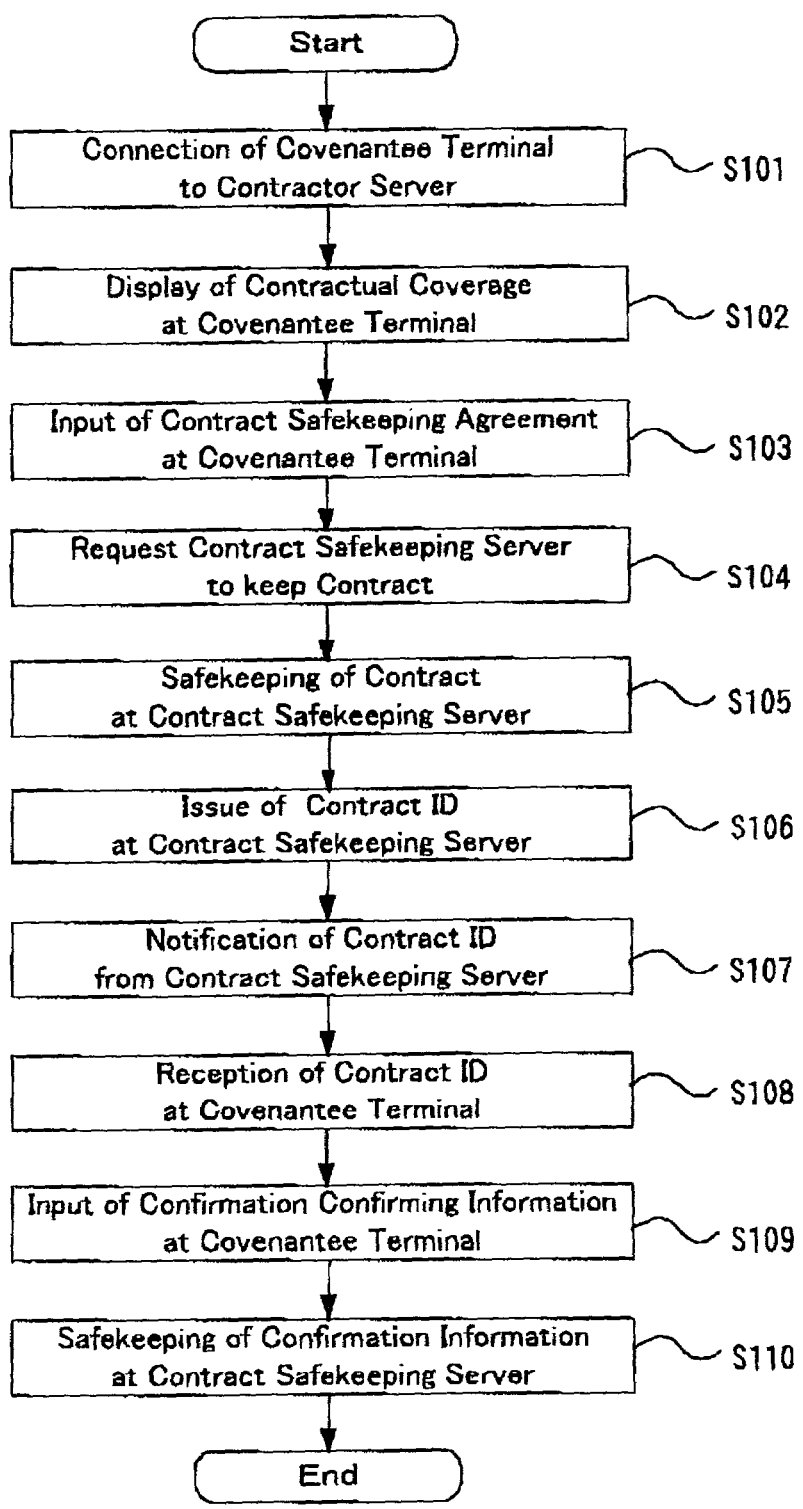
FIG. 3 is a flow chart showing in detail a step S 100 (contract safekeeping step) shown in FIG. 2.

FIG. 3 is a flowchart showing in detail contract safekeeping procedures shown in step S 100 in FIG. 2.

(1) The covenantee terminal 20 enters into a connection with the contractor server 10 (step S 101) and browses the home page of for instance commodity sales disposed at the contractor server 10.

The content being browsed is displayed on the display portion 21 of the covenantee terminal 20. The covenantee (purchaser) confirms the commodity on the home page through the display portion 21 to determine which commodity to purchase.

(2) The contractual coverage is displayed at the covenantee terminal 20 (step S 102).

When, at the purchase of the commodity, the contract is necessary to be concluded, the contractual coverage is exhibited by the contractual coverage notifying portion 11 of the contractor server 10, the contractual coverage being displayed at the covenantee terminal 20. Specifically, on the basis of the instruction from the contractual coverage notifying portion 11, the information of the contractual coverage reaches through the transmitting and receiving portion 15 to the covenantee terminal 20, thereby the contractual coverage being exhibited. The contractual coverage exhibited at the covenantee terminal 20 is displayed at the display portion 21. The contractual coverage may be shown in the home page of the contractor server 10.

Figure 4:
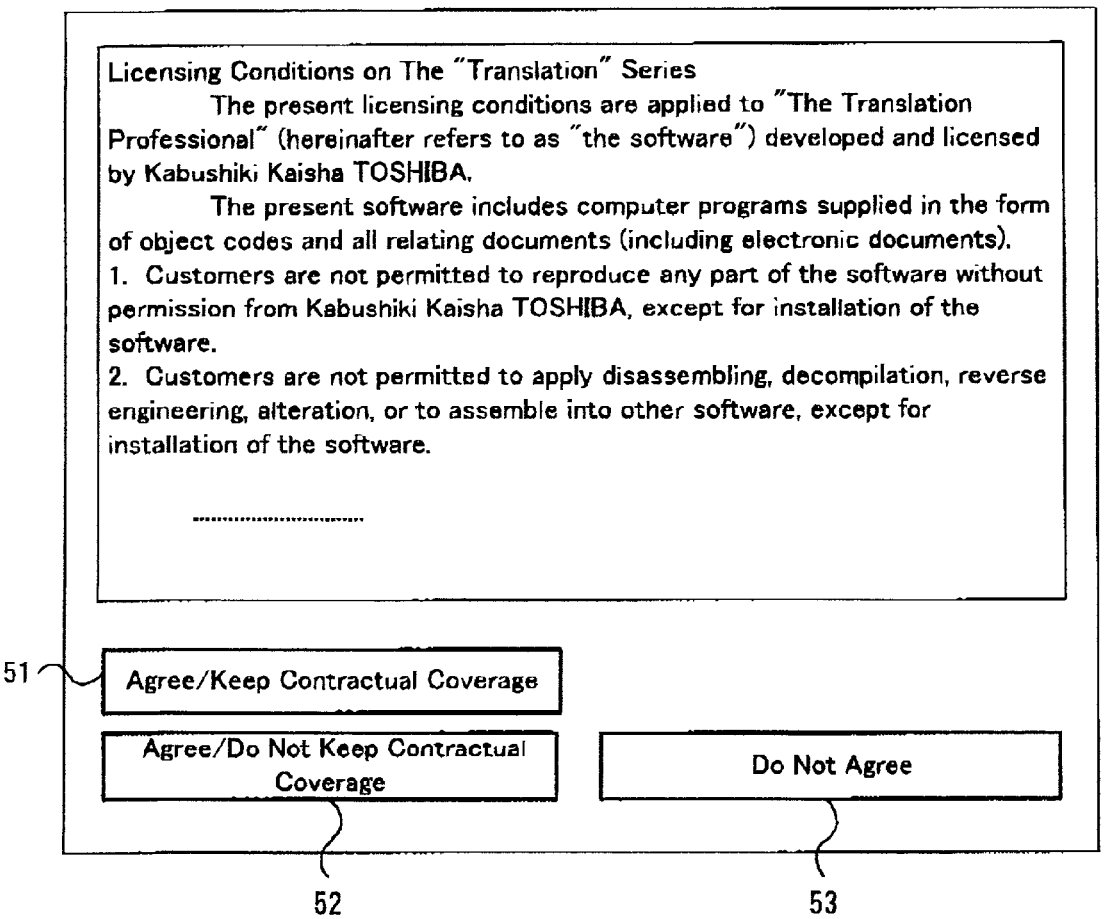
FIG. 4 is a diagram showing one example of a display screen displaying a contractual coverage at a covenantee terminal of a contract safekeeping system.

FIG. 4 is a diagram showing one example of a display screen, in which the contractual coverage is displayed. In the upper portion of the screen, the contractual coverage 50 is shown. In the lower portion thereof, a button 51 for "agreeing to the contractual coverage and keeping the contractual coverage", a button 52 for "agreeing to the contractual coverage but not keeping the contractual coverage", and a button 53 for "not agreeing to the contractual coverage" are shown.

These buttons 51 through 53 correspond to the input of the contract agreement information to the effect of agreeing to the contract and the safekeeping agreement information to the effect of agreeing to keep the contractual coverage. To click the button 51 means to input both the contract agreement information and the safekeeping agreement information. Furthermore, to click the button 52 means to input only the contract agreement information, to click the button 53 meaning to input neither the contract agreement information nor the safekeeping agreement information.

(3) The safekeeping agreement information is input at the covenantee terminal 20 (step S 103).

When the button 51 is clicked at the covenantee terminal 20, the safekeeping agreement information is input. The contract safekeeping agreement receiving portion 12 of the contractor server 10 receives the safekeeping agreement information that is input.

The contractual coverage is kept at the contract safekeeping server 30. However, when there is a plurality of contract safekeeping servers 30, the contract safekeeping server 30 may be selected therefrom for keeping the contract. The contract safekeeping server 30 may be selected from the covenantee terminal 20. For instance, it may be implemented by inputting an IP address of the contract safekeeping server 30 from the covenantee terminal 20. Furthermore, it may be selected from a plurality of servers exhibited on the home page of the contractor server 10.

When the contract safekeeping server 30 is specified thus, all of the following procedures such as the contract safekeeping or the like is carried out at the specified contract safekeeping server 30.

The contractual coverage may be kept at a plurality of the contract safekeeping servers 30. When the same contractual coverage is kept at the plurality of contract safekeeping servers 30, security in contract safekeeping and verification may be improved.

(4) The contractor server 10 makes a request to the contract safekeeping server 30 to keep the contractual coverage (step S 104).

This request is carried out on the basis of the information from the contract safekeeping requesting portion 13. At that time, in the information sent from the contract safekeeping requesting portion 13, there are the contractual coverage, the safekeeping requesting information to the effect of requesting to keep the contractual coverage, and the information identifying the contractor and the covenantee (address, name, and, as the case may be, contractor ID and the covenantee ID). Furthermore, the contract relating information such as purchasing amount (turnover), effective term of the contract, contract date and so on may be included.

(5) The contractual coverage is kept at the contract safekeeping server 30 (step S 105).

At the instruction from the contract safekeeping instructing portion 32, the contractual coverage is kept on the contract safekeeping DB 38. At this time, the information identifying the contractor and the covenantee sent together with the contractual coverage is also kept, and furthermore the contract relating information such as the sales amount (turnover), the effective term of the contract, the contract date and so on may be kept.

For the sake of easy browsing of the contractual coverage, the contract may be kept separated according to the contractor, contract division and so on.

(6) The contract ID issuing portion 33 of the contract safekeeping server 30 issues the contract ID to identify the contracts that are kept (step S 106).

The contract ID may be constituted by appropriately combining character, numeral, code and so on. When the information corresponding to the contract, characters and numerals expressing the contract date for instance ("Sep. 20, 2000" as one example), is used in part of the contract ID for instance, it is convenient from a viewpoint of comparing with the contract.

As needs arise, a password pairing with the contract ID is issued. When the contract safekeeping server 30 is configured so that the contractual coverage may be disclosed only when both the contract ID and the password are exhibited, security is improved in safekeeping and verification of the contractual coverage.

The contract ID and the password may be differentiated between the contractor server 10 and the covenantee terminal 20. When implementing thus, the contractor server 10 and the covenantee terminal 20 may manage separately the contract ID and password. Accordingly, the password may be conveniently altered according to the respective necessity.

(7) The contract ID notifying portion 34 notifies, through the transmitting and receiving portion 37, the contractor server 10 of the contract ID issued at the contract ID issuing portion (step S 107).

When the password is issued, the information including the password is notified to the contractor server 10. The contract ID and the password, when different between the contractor server 10 and the covenantee terminal 20, may be codified to send, so that the information of the contract ID and the password of the covenantee terminal 20 may not be disclosed to the contractor server 10.

(8) The contract ID that the contractor server has received is further transferred by the contract ID transferring portion 14 to the covenantee terminal 20 and received by the covenantee terminal 20 (step S 108).

The transferred content is exhibited, on the home page of the contractor server 10, only to the covenantee terminal 20.

Figure 5:
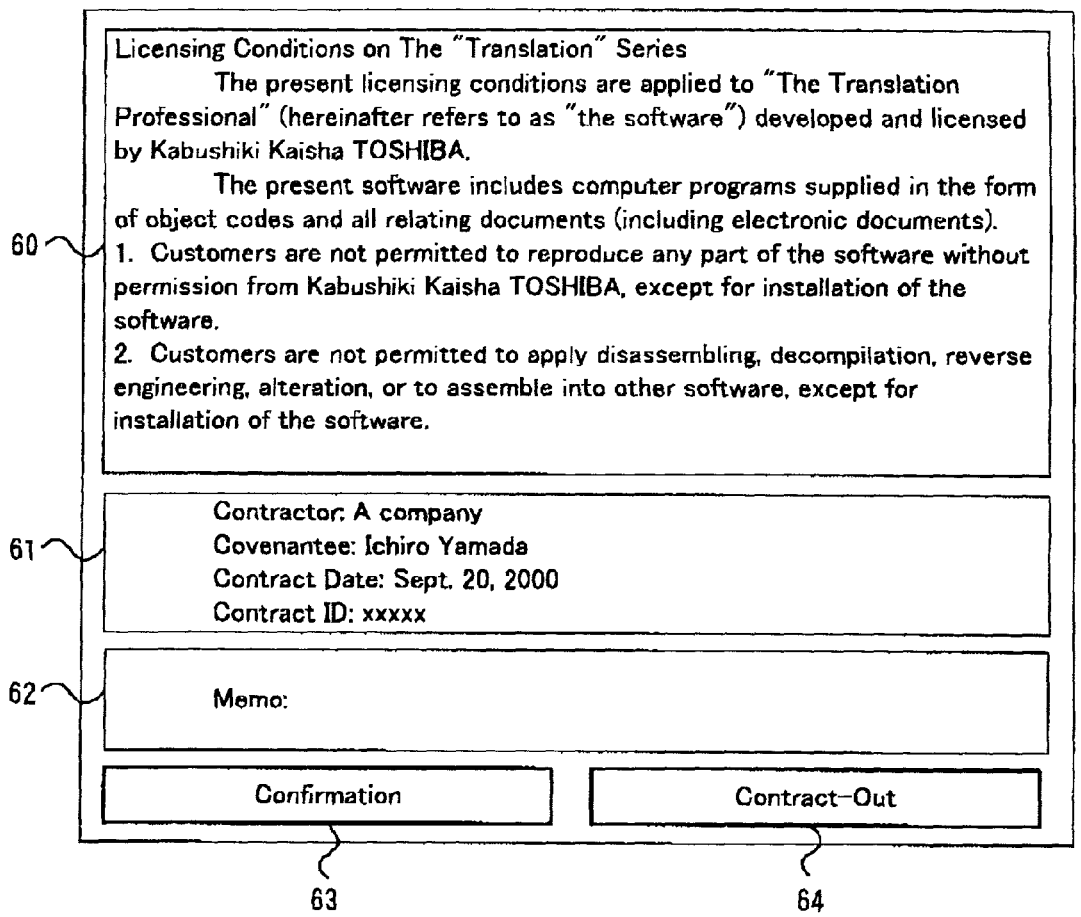
FIG. 5 is a diagram showing one example of a display screen at a covenantee terminal at the reception of a contract ID.

FIG. 5 is a diagram showing one example of a display screen on the covenantee terminal 20 when receiving the contract ID. As shown in FIG. 5, on the display screen, there are arranged the contractual coverage 60, other contract related information 61 including the contract ID, a memoranda input screen 62 for encouraging to input the memoranda, a "confirmation" button 63, and a "contract-out" button 64.

At the covenantee terminal 20, the contractual coverage 60 and the other contract related information 61 including the contract ID are confirmed. In the memoranda input screen 62, as needs arise, memoranda information such as notes or the like is input.

To click the "confirmation" button 63 means to input the confirmation information that the contractual coverage, the contract related information, and the contract ID are confirmed. To input the "contract-out" button 64 means to input cancel desire information to the effect that due to some flaw in the contractual coverage and the contract related information, the "contract-out" is desired.

When the "contract-out" button 64 is clicked, the inputted "contract-out" desire information is sent, through the contractor server 10, to the contract safekeeping server 30. The contract safekeeping server 30 erases the contractual coverage, contract related information or the like that are kept from on the contract safekeeping DB 38.

The password, when issued, may be displayed on the home page of the contractor server 10, but may be separately sent through an electronic mail or the like.

(9) At the covenantee terminal, the confirmation information to the effect that the contract ID is confirmed is input (step S 109).

The covenantee confirms the contractual coverage and the contract related information including the contract ID. When there is no flaw, by clicking the "confirmation" button 63, the confirmation information to the effect that the contract ID is confirmed is input.

The confirmation information and memoranda information that are input are transferred, through the contractor server 10, to the contract safekeeping server 30.

Before and after clicking the "confirmation" button 63, a new password may be input to change the password corresponding to the contract ID. Thereby, confidentiality in safekeeping the contract may be heightened.

(10) The confirmation information and memo information, sent to the contract safekeeping server 30, are received by the contract ID confirmation receiving portion 36, and are kept additionally together with the already kept contractual coverage on the contract safekeeping DB 38 (step S 110).

Everything is over for the contractual coverage safekeeping step S 100 shown in FIG. 2.

Next, the detail of the contractual coverage verifying 200 shown in FIG. 2 will be explained.

Figure 6:
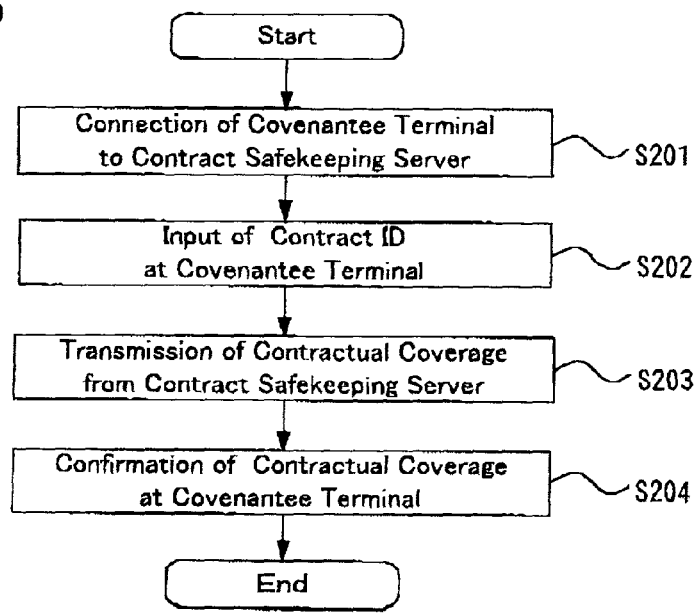
FIG. 6 is a flow chart showing in detail a step S 200 (contract verifying step) shown in FIG. 2.

FIG. 6 is a flowchart showing in detail step S 200 shown in FIG. 2.

(1) The covenantee terminal 20 enters into a connection with the contract safekeeping server 10 (step S 201).

It is convenient, for the sake of inputting and displaying at the covenantee terminal 20, to open a home page for verifying the contract on the contract safekeeping server 30 for instance.

(2) At the covenantee terminal 20, the contract ID and the password according to necessity are input (step S 202).

This is input in the input column of the contract ID on the home page for verifying the contract for instance. Only when the contract ID and the password corresponding thereto are right, at the next step S 203 the contractual coverage is exhibited.

(3) At the covenantee terminal 20, the contractual coverage is exhibited (step S 203).

The exhibition is implemented when, according to the instruction of the kept contract presenting portion 35 of the contract safekeeping server 30, the contractual coverage corresponding to the contract ID reaches through the transmitting and receiving portion 37 to the covenantee terminal 20.

(4) At the covenantee terminal 20, the contractual coverage that is sent from the contract safekeeping server 30 is conformed (step S 204).

The confirmation may be implemented by inspecting the contractual coverage, the contract related information or the like on the home page of the contract safekeeping server 30, or by printing out the contractual coverage sent through the electronic mail from the contract safekeeping server 30.

In short, when the contractual coverage is confirmed, any means for transmitting from the contract safekeeping server 30 and for confirming at the covenantee terminal 20 may be adopted.

The aforementioned modes for implementation may be expanded and changed within the scope of the present invention, the expanded and changed content being included within the technical range of the present invention.

For instance, as the contract, without restricting to the contract made and concluded at the sales of commodities, contracts in general may be included. That is, the contractor and the covenantee, without restricting to the distributor or the purchaser of the commodities, may be any parties interested in the contract in general.

Furthermore, in the present mode for implementation, the contract is made and concluded through the home page of the contractor server. However, it is not necessarily restricted thereto, but the cases where other means such as the electronic mail or the like is used to conclude the contract may be included.

The contract safekeeping server, other than simply keeping the contracts, may implement management of the contracts, such as version management when the contractual coverage is revised for instance. Thereby, when the contract safekeeping request is received, the presence of the old version contract may be notified. Furthermore, the time limit control of the contract term and the revision term may be implemented. As needs arise, the covenantee terminal or the like may be notified of an approach of the expiration of the contract.

Information exchange between the contractor server, the covenantee terminal, and the contract verifying server on the network may be appropriately codified for the confidentiality's sake of the contractual coverage or the like.

As the network, without restricting to Internet, the network in general such as LAN (Local Area Network), WAN (Wide Area Network) or the like may be included.

INDUSTRIAL APPLICABILITY

In the present contract safekeeping method, the contractual coverage made and concluded between the contractor server and the covenantee terminal is kept at the contract safekeeping server. Thereby, later the covenantee terminal or the contractor server may confirm the contractual coverage.

Accordingly, the present invention may provide a contract safekeeping system capable of keeping and confirming the contractual coverage, and the contractor server, the covenantee terminal and the contract verifying server constituting the system.

What is claimed is:

1. An electronic contract safekeeping method, comprising:
    displaying a contractual coverage of a contract at a covenantee terminal connected to a contractor server storing information of the contractual coverage;
    inputting contract agreement information representing whether agreeing to the contractual coverage or not, at the covenantee terminal;
    inputting safekeeping agreement information representing whether agreeing to a safekeeping of the contractual coverage or not, at the covenantee terminal, when the contract agreement information agreeing to the contractual coverage is inputted;
    requesting a contract safekeeping server to store the contractual coverage, when the safekeeping agreement information agreeing to the safekeeping is inputted;
    issuing a contract ID for identifying the contract at the contract safekeeping server in accordance with the request; and
    transferring the issued contract ID from the contract safekeeping server to the covenantee terminal and the contractor server.

2. An electronic contract safekeeping method as set forth in claim 1,
    wherein the inputting contract agreement information and the inputting safekeeping agreement information are performed at a same time.

3. An electronic contract safekeeping method as set forth in claim 1, further comprising:
    inputting a contract safekeeping server ID for identifying the contract safekeeping server at the covenantee terminal,
    wherein in the requesting, the contract safekeeping server in accordance with the inputted contract safekeeping server ID, is requested.

4. An electronic contract safekeeping method as set forth in claim 1, further comprising:
    selecting the contract safekeeping server from a plurality of contract safekeeping servers.

5. An electronic contract safekeeping method as set forth in claim 1, further comprising:
    wherein in the requesting, a plurality of contract safekeeping servers are requested.

6. A contractor server, comprising:
    a contractual coverage notifying unit configured to notify a covenantee terminal of a contractual coverage of a contract;
    a contract agreement receiving unit configured to prompt a user of the covenantee terminal to input contract agreement information representing whether agreeing to the notified contractual coverage or not, and receive the inputted contract agreement information;
    a safekeeping agreement receiving unit configured to prompt to the user of the covenantee terminal to input safekeeping agreement information representing whether agreeing to storing the contractual coverage or not, and receive the safekeeping agreement information, when the contract agreement information agreeing to the contractual coverage is inputted;
    a contract safekeeping requesting unit configured to request a contract safekeeping server to store the contractual coverage and to issue a contract ID for identifying the contract, when the safekeeping agreement information agreeing to the safekeeping is received;
    a contract ID receiving unit configured to receive the issued contract ID;
    a contract ID transferring unit configured to transfer the received contract ID to the covenantee terminal.

* * * * *